US008285836B2

(12) United States Patent
Haga et al.

(10) Patent No.: US 8,285,836 B2
(45) Date of Patent: Oct. 9, 2012

(54) POLICY CREATION SUPPORT METHOD, POLICY CREATION SUPPORT SYSTEM, AND PROGRAM THEREFOR

(75) Inventors: Futoshi Haga, Sagamihara (JP); Tomohiro Morimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 402 days.

(21) Appl. No.: 11/947,890

(22) Filed: Nov. 30, 2007

(65) Prior Publication Data
US 2008/0228755 A1 Sep. 18, 2008

(30) Foreign Application Priority Data
Mar. 14, 2007 (JP) .................. 2007-065134

(51) Int. Cl.
*G06F 15/173* (2006.01)
(52) U.S. Cl. ....................................... 709/224
(58) Field of Classification Search .................. 709/223, 709/224, 226
See application file for complete search history.

(56) References Cited

U.S. PATENT DOCUMENTS

| 2002/0087611 A1* | 7/2002 | Tanaka et al. ............... 709/1 |
| 2002/0116479 A1* | 8/2002 | Ishida et al. ................ 709/220 |
| 2005/0102398 A1* | 5/2005 | Zhang et al. ................ 709/225 |
| 2005/0131993 A1 | 6/2005 | Fatula, Jr. |
| 2005/0154576 A1 | 7/2005 | Tarui et al. |

FOREIGN PATENT DOCUMENTS

| JP | 2005-182796 | 7/2005 |
| JP | 2005-196601 | 7/2005 |

OTHER PUBLICATIONS

I Want Insight Into the Performance of My Critical Applications, Hy-Perfom-Ix.com, Oct. 15-16, Austin Texas, p. 401, Oct. 2007.

* cited by examiner

*Primary Examiner* — John Macilwinen
(74) *Attorney, Agent, or Firm* — Antonelli, Terry, Stout & Kraus, LLP.

(57) ABSTRACT

A policy creation support system is provided, which is capable of reducing cost for creation of an effective autonomic control policy. The policy creation support system measures information indicating performance of a monitoring target system, with regard to a monitoring item of a designated type, for each resource amount of an expandable resource, and selects one representative measurement value from among measurement values on a resource-amount basis. Then, the policy creation support system outputs the monitoring item, the resource amount serving as the monitoring item, and a range of the measurement value corresponding to the resource amount, as a countermeasure decision condition within a policy, by setting a range including the selected representative measurement value as the range of the measurement value.

2 Claims, 17 Drawing Sheets

FIG. 2

SLA STORAGE UNIT 121

| | | |
|---|---|---|
| 1210 | MONITORING METRIC | RESPONSE TIME |
| 1211 | MONITORING THRESHOLD | 8 SECONDS |

FIG. 3

RESOURCE CONFIGURATION INFORMATION STORAGE UNIT 127

| RESOURCE ID | ADDRESS | FUNCTION MODULE ID | RESOURCE TYPE |
|---|---|---|---|
| 111 | 1.0.0.1 | aaa | Web SERVER |
| 222 | 1.0.0.2 | — | Web SERVER |
| 333 | 1.0.0.3 | bbb,ccc | AP SERVER |
| 444 | 1.0.0.4 | bbb,ccc | AP SERVER |
| 555 | 1.0.0.5 | — | AP SERVER |
| 666 | 1.0.0.6 | ddd | DB SERVER |
| 777 | 1.0.0.7 | — | DB SERVER |
| ⋮ | ⋮ | ⋮ | ⋮ |

FIG. 4

PERFORMANCE MEASUREMENT INFORMATION STORAGE UNIT 123

| FUNCTION MODULE ID 1230 | MONITORED RESOURCE TYPE 1231 | MONITORING METRIC ID 1232 | EXPANSION RESOURCE TYPE 1233 | RESOURCE AMOUNT 1234 | MEASUREMENT TIME 1235 | MEASUREMENT VALUE 1236 | LOAD 1237 |
|---|---|---|---|---|---|---|---|
| aaa | Web SERVER | CPU UTILIZATION RATE | Web SERVER | 1 | 2004/01/15 12:24:48 | 1% | 1 |
| aaa | Web SERVER | CPU UTILIZATION RATE | Web SERVER | 1 | 2004/01/15 12:25:03 | 4% | 2 |
| aaa | Web SERVER | CPU UTILIZATION RATE | Web SERVER | 1 | 2004/01/15 12:25:18 | 9% | 3 |
| ... | ... | ... | ... | ... | ... | ... | ... |
| aaa | Web SERVER | CPU UTILIZATION RATE | Web SERVER | 1 | 2004/01/15 12:45:18 | 40% | 27 |
| aaa | Web SERVER | CPU UTILIZATION RATE | Web SERVER | 2 | 2004/01/15 12:34:48 | 23% | 27 |
| aaa | Web SERVER | CPU UTILIZATION RATE | Web SERVER | 2 | 2004/01/15 12:35:03 | 25% | 29 |
| aaa | Web SERVER | CPU UTILIZATION RATE | Web SERVER | 2 | 2004/01/15 12:35:18 | 26% | 30 |
| ... | ... | ... | ... | ... | ... | ... | ... |
| aaa | Web SERVER | CPU UTILIZATION RATE | Web SERVER | 2 | 2004/01/15 12:55:18 | 50% | 42 |
| eee | Web SERVER | MEMORY UTILIZATION RATE | Web SERVER | 1 | 2004/01/15 12:24:48 | 1% | 1 |
| eee | Web SERVER | MEMORY UTILIZATION RATE | Web SERVER | 1 | 2004/01/15 12:25:03 | 5% | 2 |
| eee | Web SERVER | MEMORY UTILIZATION RATE | Web SERVER | 1 | 2004/01/15 12:25:18 | 10% | 3 |
| ... | ... | ... | ... | ... | ... | ... | ... |
| eee | Web SERVER | MEMORY UTILIZATION RATE | Web SERVER | 1 | 2004/01/15 12:45:18 | 39% | 27 |
| eee | Web SERVER | MEMORY UTILIZATION RATE | Web SERVER | 2 | 2004/01/15 12:34:48 | 20% | 27 |
| eee | Web SERVER | MEMORY UTILIZATION RATE | Web SERVER | 2 | 2004/01/15 12:35:03 | 21% | 29 |
| eee | Web SERVER | MEMORY UTILIZATION RATE | Web SERVER | 2 | 2004/01/15 12:35:18 | 22% | 30 |
| ... | ... | ... | ... | ... | ... | ... | ... |
| eee | Web SERVER | MEMORY UTILIZATION RATE | Web SERVER | 2 | 2004/01/15 12:45:18 | 43% | 42 |
| ... | ... | ... | ... | ... | ... | ... | ... |

FUNCTION MODULE CONFIGURATION INFORMATION STORAGE UNIT 125

APPLICATION NAME: ONLINE STORE — 1250

| 1251 | 1252 | 1253 | 1254 | 1255 |
|---|---|---|---|---|
| SERVICE NAME | FUNCTION MODULE ID | RESOURCE TYPE | EXPANDABLE? | EXPANSION UPPER-LIMIT |
| LOGIN | aaa | Web SERVER | YES | 5 |
| LOGIN | bbb | AP SERVER | YES | 4 |
| LOGIN | ccc | AP SERVER | YES | 3 |
| LOGIN | ddd | DB SERVER | NO | 0 |
| PRODUCT SEARCH | eee | Web SERVER | NO | 0 |
| PRODUCT SEARCH | fff | AP SERVER | YES | 2 |
| PRODUCT SEARCH | ggg | DB SERVER | YES | 4 |
| ⋮ | ⋮ | ⋮ | ⋮ | ⋮ |

PERFORMANCE CHARACTERISTIC EVALUATION INFORMATION STORAGE UNIT 111

| 1110 | 1111 | 1112 | 1113 | 1114 | 1115 | 1116 | 1117 |
|---|---|---|---|---|---|---|---|
| SERVICE NAME | FUNCTION MODULE ID | MONITORED RESOURCE TYPE | MONITORING METRIC ID | EXPANSION RESOURCE TYPE | RESOURCE AMOUNT | REPRESENTATIVE MEASUREMENT VALUE | CHANGE AMOUNT |
| LOGIN | aaa | Web SERVER | CPU UTILIZATION RATE | Web SERVER | 1 | 40% | |
| LOGIN | aaa | Web SERVER | CPU UTILIZATION RATE | Web SERVER | 2 | 50% | +40 |
| LOGIN | aaa | Web SERVER | CPU UTILIZATION RATE | Web SERVER | 3 | 60% | |
| LOGIN | aaa | Web SERVER | CPU UTILIZATION RATE | Web SERVER | 4 | 80% | |
| PRODUCT SEARCH | eee | Web SERVER | MEMORY UTILIZATION RATE | Web SERVER | 1 | 40% | |
| PRODUCT SEARCH | eee | Web SERVER | MEMORY UTILIZATION RATE | Web SERVER | 2 | 32% | −30 |
| PRODUCT SEARCH | eee | Web SERVER | MEMORY UTILIZATION RATE | Web SERVER | 3 | 25% | |
| PRODUCT SEARCH | eee | Web SERVER | MEMORY UTILIZATION RATE | Web SERVER | 4 | 10% | |
| ... | ... | ... | ... | ... | ... | ... | ... |

1118

CHANGE AMOUNT CALCULATION PROCESSING

Content extraction

POLICY CREATION SUPPORT METHOD, POLICY CREATION SUPPORT SYSTEM, AND PROGRAM THEREFOR

BACKGROUND OF THE INVENTION

The present invention relates to a technology of controlling a monitoring target system so as to satisfy a predetermined contract condition regarding the monitoring target system.

US Patent Publication No. 20050131993 (hereinafter, referred to as "Patent Document 1") discloses a technology relating to autonomic management of a grid computing system. The system disclosed in Patent Document 1 includes a plurality of system policies, and interprets a system policy corresponding to a trigger event in response to the trigger event that has occurred in the system, to thereby control an operation and allocation of a system resource within the system.

Japanese Patent Laid-open Publication No. 2005-196601 (hereinafter, referred to as "Patent Document 2") discloses a technology of verifying, through simulation, validity of an autonomic control policy used in an management system having an autonomic control function. The use of the technology can increase accuracy of the autonomic control policy by adjusting the created autonomic control policy based on results of the simulation.

"HyPerformix Capacity Manager" (retrieved online on Jul. 14, 2006 from the Internet URL: http://www.hyperformix.com/Default.asp?Page=401) (hereinafter, referred to as "Non-patent Document 1") introduces a product which uses a simulation tool using a graphical user interface (GUI) for capacity design of an IT system. The use of the product facilitates modeling of the IT system which executes a simulation, and allows an intuitive understanding of influences of a change in configuration of the IT system by confirming simulation results graphically, which leads to reduction in the cost of equipment planning.

SUMMARY OF THE INVENTION

The term "autonomic control policy" simply represents a combination of a condition and an action, in which the condition refers to a monitoring item of a monitoring target system, and the action refers to control of the monitoring target system. Creation of the autonomic control policy requires comprehension of the configuration of an entire monitoring target system, and also a thorough understanding of hardware properties and software properties of each resource that constitutes the monitoring target system. Accordingly, the creation of an autonomic control policy requires abundant experience and know-how. Further, with larger scale and more complex systems, cost for the creation of an autonomic control policy is increasing. Therefore, there is a need to create an effective autonomic control policy more quickly and at lower cost.

Patent Document 1 discloses a system which operates by using an autonomic control policy created in advance, but does not disclose how the autonomic control policy is created. Similarly, Patent Document 2 discloses a system which uses a created autonomic control policy to simulate operation of the system to which the autonomic control policy is applied, but does not disclose how the autonomic control policy is created as an input to the simulation.

In Non-patent Document 1, actual measurement data is reflected in the modeling of the IT system to thereby improve the accuracy of the simulation, and the results are displayed graphically to allow an intuitive understanding of influences of a change in resource configuration. However, regarding a case where the performance required for the IT system cannot be satisfied depending on the inputted load, Non-patent Document 1 does not provide means which judge how the resource configuration of the IT system is changed to satisfy the required performance. According to the conventional technologies, no one but an system operator can create the autonomic control policy, which makes it difficult to reduce cost for describing the experience and know-how of the system operator in the autonomic control policy.

FIG. 16 shows a procedure of operating an autonomic control policy in an autonomous system in a case of using conventional technology. First, a service user performs a service requirement analysis (S300) and creates a contract condition containing a service level agreement (SLA) for the service (S301). The SLA includes one or a plurality of items, examples of which may include a response time of an application. To be specific, there may be a requirement that requires the response time to be within 8 seconds. Upon reception of the SLA (S302), an system operator performs a performance analysis of the monitoring target system in which the application is made to operate (S303) to obtain information necessary for creating an autonomic control policy conforming to the SLA. In the performance analysis in this case, measurement using a real machine or a simulation can be used.

Subsequently, based on the results of the performance analysis, the system operator creates the action content and the action decision condition of an autonomic control policy (S304, S305). This is a task in which the experience and know-how of the system operator are important, and it is difficult to reduce costs using conventional technology. After the autonomic control policy has been created, the system operator uses a tool, or the like, to describe and verify the autonomic control policy (S306, S307), and registers the created autonomic control policy in the management system (S308), thereby preparing for the start of operation and administration, while conforming with the SLA by autonomic control.

FIG. 17 shows an example of the autonomic control policy generated by the system operator through the procedure of FIG. 16. Information indicating an action for expanding a Web server is stored as an action content 81 of an autonomic control policy 80, which serves to conform to the response time of 8 seconds as an example of the SLA. The action decision condition 82 stores information indicating that processing indicated in the action content is executed if a "CPU utilization rate" on a "Web server" is "40% or more" when the resource amount of the Web server is "1", with regard to a function module whose function module ID is "aaa", among function modules constituting a service called "login".

A resource expansion target 810 of the action content 81, and a service name 820, a function module ID 821, a monitored resource type 822, a monitoring metric ID 823, a resource amount 824, and a measurement value range 825 of the action decision condition 82, need to be created by the system operator based on results of the performance analysis of the monitoring target system. This is a task that requires considerable experience and know-how, and, in handling the management system that has an autonomic control function, becomes a large burden on the system operator.

The present invention has been made in view of the above-mentioned situations, and an object of the present invention is to reduce cost in creating an effective policy.

In order to achieve the above-mentioned object, in the present invention, information indicating performance of a monitoring target system is measured for each resource amount of an expandable resource with regard to a monitoring item of a designated type, one representative measurement value is selected from among measurement values on a resource-amount basis, and information is outputted, indicating the monitoring item, the resource amount serving as the monitoring item, and a range of the measurement value corresponding to the resource amount.

For example, according to a first aspect of the present invention, there is provided a policy creation support method for a policy creation support system which is used to control a monitoring target system to satisfy a contract condition, and which supports creation of a policy that contains: a condition indicating a state of the monitoring target system; and an action executed if the state of the monitoring target system satisfies the condition, the condition containing: a monitoring item serving as a monitoring target in the monitoring target system; and a range of a measurement value with regard to the monitoring item, the policy creation support method including the following steps executed by the policy creation support system: a retaining step of retaining a template used to designate type of the monitoring item necessary for the creation of the policy; an obtaining step of obtaining the measurement value of each resource amount for a resource serving as an expansion target, with regard to each monitoring item corresponding to the type designated by the template; a selecting step of selecting one representative measurement value from among the measurement values on a resource-amount basis with regard to each monitoring item corresponding to the type designated by the template; and an outputting step of outputting the monitoring item, the resource amount serving as the monitoring item, and the range of the measurement value corresponding to the resource amount, with regard to each monitoring item corresponding to the type designated by the template, by setting a range including the selected representative measurement value as the range of the measurement value.

Further, according to a second aspect of the present invention, there is provided a policy creation support system, which is used to control a monitoring target system to satisfy a contract condition, and which supports creation of a policy that contains: a condition indicating a state of the monitoring target system; and an action executed if the state of the monitoring target system satisfies the condition, the condition containing: a monitoring item serving as a monitoring target in the monitoring target system; and a range of a measurement value with regard to the monitoring item, the policy creation support system including: a template retaining unit which retains a template used to designate a type of the monitoring item necessary for the creation of the policy; a measurement value obtaining unit which obtains the measurement value of each resource amount of a resource serving as an expansion target, with regard to each monitoring item corresponding to the type designated by the template; a representative measurement value selecting unit which selects one representative measurement value from among the measurement values on a resource-amount basis with regard to each monitoring item corresponding to the type designated by the template; and an outputting unit which outputs the monitoring item, the resource amount serving as the monitoring item, and the range of the measurement value corresponding to the resource amount, with regard to each monitoring item corresponding to the type designated by the template, by setting a range including the selected representative measurement value as the range of the measurement value.

Further, according to a third aspect of the present invention, there is provided a program, which causes a computer to operate as a policy creation support system that is used to control a monitoring target system to satisfy a contract condition, and that supports creation of a policy that contains: a condition indicating a state of the monitoring target system; and an action executed if the state of the monitoring target system satisfies the condition, the condition containing: a monitoring item serving as a monitoring target in the monitoring target system; and a range of a measurement value with regard to the monitoring item, the program causing the computer to implement the following functions: a template retaining function of retaining a template used to designate a type of the monitoring item necessary for the creation of the policy; a measurement value obtaining function of obtaining the measurement value of each resource amount of a resource serving as an expansion target, with regard to each monitoring item corresponding to the type designated by the template; a representative measurement value selecting function of selecting one representative measurement value from among the measurement values on a resource-amount basis with regard to each monitoring item corresponding to the type designated by the template; and an outputting function of outputting the monitoring item, the resource amount serving as the monitoring item, and the range of the measurement value corresponding to the resource amount, with regard to each monitoring item corresponding to the type designated by the template, by setting a range including the selected representative measurement value as the range of the measurement value.

According to the present invention, it is possible to reduce the cost of creating of an effective policy.

BRIEF DESCRIPTION OF THE DRAWINGS

In the accompanying drawings:

FIG. 2 is an explanatory diagram illustrating a data structure stored in an SLA storage unit;

FIG. 3 is an explanatory diagram illustrating a data structure stored in a resource configuration information storage unit;

FIG. 4 is an explanatory diagram illustrating a data structure stored in a performance measurement information storage unit;

FIG. 5 is an explanatory diagram illustrating a data structure stored in a function module configuration information storage unit;

FIG. 7 is an explanatory diagram illustrating a data structure stored in a performance characteristic evaluation information storage unit;

DESCRIPTION OF THE PREFERRED EMBODIMENTS

Hereinafter, description will be made of a first embodiment of the present invention.

Figure 1:
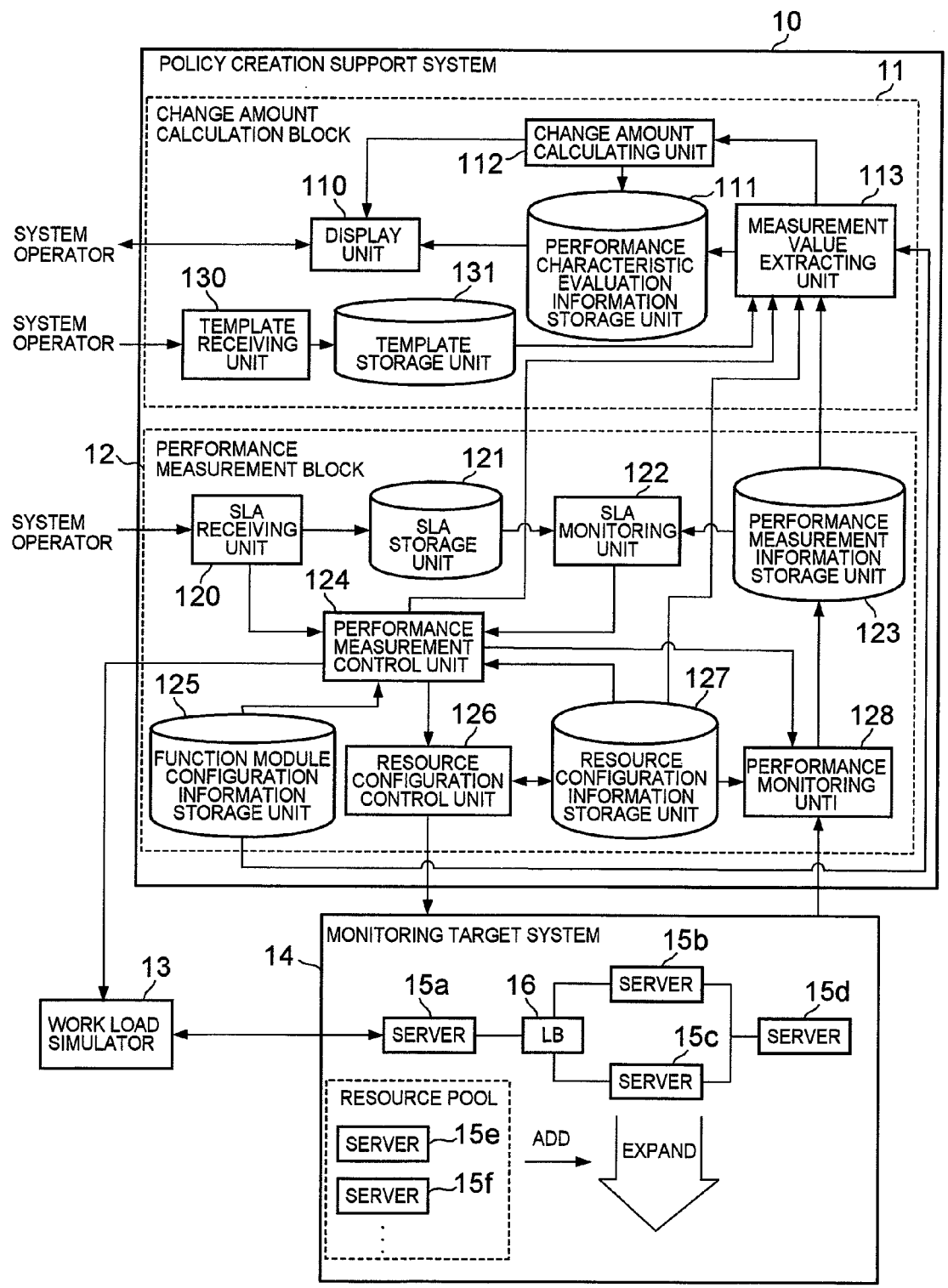
FIG. 1 is a system configuration diagram illustrating a configuration of a policy creation support system according to a first embodiment of the present invention.

FIG. 1 is a system configuration diagram illustrating a configuration of a policy creation support system 10 according to the first embodiment of the present invention. The policy creation support system 10 is interconnected with a work load simulator 13 and a monitoring target system 14 via a communication network.

The work load simulator 13 generates a dummy load, such as a user request or the like, and inputs the load to the monitoring target system 14. Examples thereof include a load testing tool or a dummy traffic generating apparatus, which are generally used. The work load simulator 13 has a function of gradually increasing the load applied to the monitoring target system 14 with the elapse of time in response to an instruction from the policy creation support system 10.

The monitoring target system 14 is managed by an management system having an autonomic control function, and is constituted of a plurality of computer apparatuses. Note that at the actual operation, the management system dynamically changes configurations of IT resources within the monitoring target system 14 depending on the load applied to the monitoring target system 14 according to an autonomic control policy created by an system operator or the like. The policy creation support system 10 of the present invention provides an autonomic control policy candidate which serves to create an autonomic control policy used by the management system.

The computer apparatuses within the monitoring target system 14 each have a computing function such as a central processing unit (CPU), storage functions such as a memory and a hard disk drive, and a communication function. The monitoring target system 14 has a load balancer (LB) 16 and a plurality of servers 15, which are examples of the computer apparatuses. Arranged in and connected to the monitoring target system 14 is a computer resource of an amount enough for implementing an application provided by the monitoring target system 14, the computer resource being set in advance by a system designer or the like.

In this embodiment, examples of the application provided by the monitoring target system 14 include an online store. The application is composed of a plurality of services including a login function, a product search function, and the like. The services are each implemented by a single or a plurality of function modules which operate on a single or a plurality of computer resources.

Further, the monitoring target system 14 of this embodiment has a system structure of a Web 3-tier model. The Web 3-tier model is an example of the monitoring target system 14 of this embodiment, but a Web 2-tier model or a Web 1-tier model may also be used. Alternatively, regardless of the Web system, any IT system may be used that can be managed by an management system having an autonomic control function. A server 15a functions as a Web server which performs receiving processing for a request and the like from a user (client) of the service provided by the monitoring target system 14. Servers 15b and 15c function as application (AP) servers which process the service provided to the client. A server 15d functions as a database (DB) server which manages application data and the like, used for providing the service to the client.

In this embodiment, the AP servers can be expanded depending on increase of the load applied to the monitoring target system 14. For expansion of the AP servers, an unused server 15e or 15f managed in a resource pool or the like is assigned as a new AP server. The expansion or contraction of the computer resource of the monitoring target system 14 is performed by the policy creation support system 10 when the autonomic control policy candidate is created by the policy creation support system 10. Each of the computer apparatuses within the monitoring target system 14 has a performance reporting function of measuring the performance of its own apparatus in terms of monitoring metrics that are performance items of the respective apparatuses and of reporting the performance to the policy creation support system 10.

In this embodiment, a performance measuring function of each computer apparatus periodically measures the monitoring metrics of its own apparatus, and periodically transmits measurement results to the policy creation support system 10. In another example, the performance measuring function of each computer apparatus may measure the monitoring metrics of its own apparatus, and transmit the measurement values to the policy creation support system 10 when a change of at least a predetermined value is found in the measurement results. In yet another example, the policy creation support system 10 may periodically obtain performance information of each computer apparatus. Also in this case, each computer apparatus may continuously measure the performance of its own apparatus, or may measure the performance in response to an inquiry from the policy creation support system 10, or any performance measurement method may be adopted as long as a general performance measuring function can perform the performance measurement method.

In this embodiment, the term "monitoring metric" represents a performance item of a computer resource which can be measured in the computer resource within the monitoring target system 14. Examples of the monitoring metric include a CPU utilization rate, a memory utilization rate, a disk utilization rate, or a database I/O consumption rate.

In this specification, the term "computer resource" represents a computer resource that can be expanded and contracted, examples of which include a computer apparatus such as a server, each of a plurality of CPUs provided by one or a plurality of computer apparatuses, a part or entirety of a memory space provided by one or a plurality of computer apparatuses, and a storage area of a storage or the like that is likewise provided. The unit of the computer resource varies depending on what the computer resource represents. For example, when the computer resource (hereinafter, sometimes referred to simply as "resource") represents the computer apparatus, the number of computer apparatuses is used as the unit thereof. In this embodiment, the resource to be expanded is the server 15, and the expansion or contraction of the resource is performed on a server 15 basis.

The policy creation support system 10 includes a change amount calculation block 11 and a performance measurement block 12. The policy creation support system 10 is constituted of a single computer apparatus or as a system in which a plurality of computer apparatuses are interconnected. The computer apparatus within the policy creation support system 10 which is operated by an system operator of the policy creation support system 10 is provided with a display function such as a display and an input function such as a keyboard or a mouse.

The performance measurement block 12 includes an SLA receiving unit 120, an SLA storage unit 121, an SLA monitoring unit 122, a performance measurement information storage unit 123, a performance measurement control unit 124, a function module configuration information storage unit 125, a resource configuration control unit 126, a resource configuration information storage unit 127, and a performance monitoring unit 128.

Upon reception of a service level agreement (SLA) from the system operator of the policy creation support system 10, the SLA receiving unit 120 stores the received SLA in the SLA storage unit 121, and instructs the performance measurement control unit 124 to start measurement of the performance of the monitoring target system 14. As shown in the example of FIG. 2, the SLA includes: a monitoring metric 1210 which represents such a monitoring target performance item as to recognize performance information on the application; and a monitoring threshold 1211 which defines a performance threshold for the monitoring metric 1210.

The SLA storage unit 121 stores the SLA received via the SLA receiving unit 120. In this embodiment, the policy creation support system 10 supports creation of an autonomic control policy which serves to control the monitoring target system 14 so that a response time of the monitoring metric is kept equal to or less than 8 seconds defined as the monitoring threshold.

As shown in the example of FIG. 3, the resource configuration information storage unit 127 stores: an address 1271 representing location information of the computer resource; a function module ID 1272 which is an identifier of a function module operating on the computer resource and is unique across the entire monitoring target system 14; and a resource type 1273 with which the computer resource can be assigned, in association with a resource ID 1270 which is an identifier of the computer resource constituting the monitoring target system 14. One or a plurality of function module IDs are stored as the function module ID 1272 because one or a plurality of function modules can operate on a single computer resource.

In the example shown in FIG. 3, a blank function module ID 1272 field indicates that a computer resource having the corresponding resource ID 1270 is managed in the resource pool and is a free resource on which no function module is operating. Data stored in the resource configuration information storage unit 127 is previously set as initial data by a system designer or the like, and is updated by the resource configuration control unit 126.

When the resource configuration control unit 126 receives from the performance measurement control unit 124 a resource control instruction which contains the function module ID, the resource type of the computer resource, and a resource amount by which the computer resource is expanded or contracted, the resource configuration control unit 126 references the resource configuration information storage unit 127 to change the computer resource within the monitoring target system 14 according to the received resource control instruction, and stores results of the change in the resource configuration information storage unit 127.

For example, upon reception of the resource control instruction containing information indicating the function module ID being "aaa", the resource type being "Web server", and the resource amount for expansion being "1", the resource configuration control unit 126 references the resource configuration information storage unit 127 to extract therefrom one of the resource IDs that corresponds to the computer resource with the resource type being "a Web server" on which no function module is operating. In the example of FIG. 3, the resource configuration control unit 126 extracts, for example, the resource ID of "222".

Based on an address ("1.0.0.2" in the example of FIG. 3) corresponding to the extracted resource ID, the resource configuration control unit 126 accesses a computer resource corresponding to the resource ID, and causes a function module corresponding to the ID "aaa" contained in the resource control instruction to operate on the computer resource. Then, the resource configuration control unit 126 stores the ID "aaa" corresponding to the operated function module in the resource configuration information storage unit 127 in association with the resource ID "222". Note that the function of the resource configuration control unit 126 is a function which is generally used for clustering technology or the like.

As shown in the example of FIG. 4, the performance measurement information storage unit 123 stores a plurality of records 1238. Each of the records 1238 includes a field 1230 which stores a function module ID, a field 1231 which stores a type of a monitoring target computer resource, a field 1232 which stores a monitoring metric ID identifying a monitoring metric, a field 1233 which stores an expansion resource type indicating a type of a computer resource to be expanded, a field 1234 which stores a resource amount of the computer resource to be expanded, a field 1235 which stores a measurement time, a field 1236 which stores a measurement value, and a field 1237 which stores a load applied to a computer resource specified by the monitored resource type within the field 1231.

As described above, the performance measurement information storage unit 123 stores the measurement value in terms of the monitored resource for each combination of the function module ID, the monitoring metric ID, the expansion resource type, and the resource amount of the expansion resource. Note that in this embodiment, the load stored in the field 1237 is, for example, the number of responses outputted from the monitoring target computer resource per unit time period, and is obtained from the monitoring target system 14 as one of the measurement values with respect to the monitoring target resource.

Upon reception of the measurement information acquisition instruction containing the expansion resource type from the performance measurement control unit 124, the performance monitoring unit 128 starts to obtain the measurement value of each monitoring metric of the computer resources in terms of each of the computer resources that constitute the monitoring target system 14. The measurement value obtained from the monitoring target system 14 contains the function module ID, the monitoring metric ID, the measurement time, and the measurement value itself. Based on the expansion resource type contained in the measurement information acquisition instruction obtained from the performance measurement control unit 124 and the function module ID contained in the measurement value, the performance monitoring unit 128 references the resource configuration information storage unit 127 to obtain the current resource amount of the expansion resource.

For example, the performance monitoring unit 128 receives the measurement information acquisition instruction containing "AP server" as the expansion resource type from the performance measurement control unit 124, and receives the measurement value containing the function module ID "bbb" from the monitoring target system 14. If the resource configuration information storage unit 127 stores the information shown in FIG. 3, the resource configuration information storage unit 127 indicates that the AP servers on which the function module having an ID of "bbb" is operating correspond to the resource IDs "333" and "444". The performance monitoring unit 128 extracts the number "2", which is the number of AP servers on which the function module having the ID of "bbb" is operating, as the resource amount of the expansion resource. Then, the performance monitoring unit 128 stores in the performance measurement information storage unit 123 the measurement value obtained from the monitoring target system 14 along with the expansion resource type and the resource amount. Note that the function of the performance monitoring unit 128 is a function which is generally used for the management system having an autonomic control function.

It should be noted that the performance monitoring unit 128 performs measurement to obtain not only the measurement value of the item specified as shown in FIG. 4 by a combination of the function module ID, the monitored resource type, and the monitoring metric ID, but also the measurement value of an item specified by information other than the combination of the function module ID, the monitored resource type, and the monitoring metric ID, such as an item on an operating system (OS) basis or a CPU basis, and stores the measurement values in the performance measurement information storage unit 123.

Of the monitoring metrics stored in the performance measurement information storage unit 123, the SLA monitoring unit 122 monitors the same monitoring metric as the monitoring metric stored in the SLA storage unit 121. If the measurement value of the monitoring metric exceeds the monitoring threshold stored in the SLA storage unit 121, the SLA monitoring unit 122 notifies the performance measurement control unit 124 that the measurement value indicates SLA violation.

As shown in the example of FIG. 5, the function module configuration information storage unit 125 stores a field 1250 which stores an application name and a plurality of records 1256. Each of the records 1256 includes a field 1251 which stores a service name, a field 1252 which stores a function module ID, a field 1253 which stores a resource type, a field 1254 which stores information indicating whether or not a computer resource can be expanded in terms of a function module corresponding to the function module ID stored in the field 1252, and a field 1255 which stores a value representing an upper-limit resource amount by which the expandable computer resource can be expanded.

When instructed by the SLA receiving unit 120 to start the measurement of the performance of the monitoring target system 14, the performance measurement control unit 124 references the function module configuration information storage unit 125 to select one function module ID and one expansion resource type of the expandable computer resource, and transmits a measurement information acquisition instruction containing the selected expansion resource type to the performance monitoring unit 128.

Then, the performance measurement control unit 124 instructs the resource configuration control unit 126 to cause the monitoring target system 14 to operate with a computer resource configuration in an initial state, while instructing the work load simulator 13 to gradually increase the load applied to the monitoring target system 14 as time passes. Note that the resource configuration information storage unit 127 stores information relating to an initial-state computer resource configuration of the monitoring target system 14. Before starting performance measurement processing, the performance measurement control unit 124 obtains the information relating to the initial-state computer resource configuration from the resource configuration information storage unit 127, stores the information, and if necessary, instructs the resource configuration control unit 126 to set the computer resource configuration of the monitoring target system 14 to the initial state.

If notified by the SLA monitoring unit 122 that the monitoring target system 14 is violating the SLA after the load applied to the monitoring target system 14 has gradually increased, the performance measurement control unit 124 instructs the work load simulator 13 to stop the increase of the load inputted to the monitoring target system 14, and to maintain the load inputted to the monitoring target system 14. Then, the performance measurement control unit 124 increases a resource to be expanded by transmitting to the resource configuration control unit 126 a resource control instruction containing the function module ID, the expansion resource type, and the resource amount by which the resource is to be expanded.

If the SLA violation is resolved, the performance measurement control unit 124 instructs the work load simulator 13 to restart to increase the load inputted to the monitoring target system 14. In a case where the SLA violation is not resolved even if the expansion target resource has been increased, the performance measurement control unit 124 restores the expansion target resource to an initial value, and increases another expandable resource.

The performance measurement control unit 124 repeats the processing as described above for every combination of the function module ID and the expansion resource type. When the above-mentioned processing ends for all the combination of the function module ID and the expansion resource type, the performance measurement control unit 124 instructs the change amount calculation block 11 to start calculation of a change amount.

Next, a description will be given concerning the change amount calculation block 11. The change amount calculation block 11 includes a display unit 110, a performance characteristic evaluation information storage unit 111, a change amount calculating unit 112, a measurement value extracting unit 113, a template receiving unit 130, and a template storage unit 131.

Upon reception of a template from the system operator of the policy creation support system 10, the template receiving unit 130 stores the received template in the template storage unit 131, for example, in an extensible markup language (XML) format. The template contains description of items necessary for creating a policy, and the measurement value extracting unit 113 to be described later collects or creates data with regard to the items described in the template.

Figure 6:
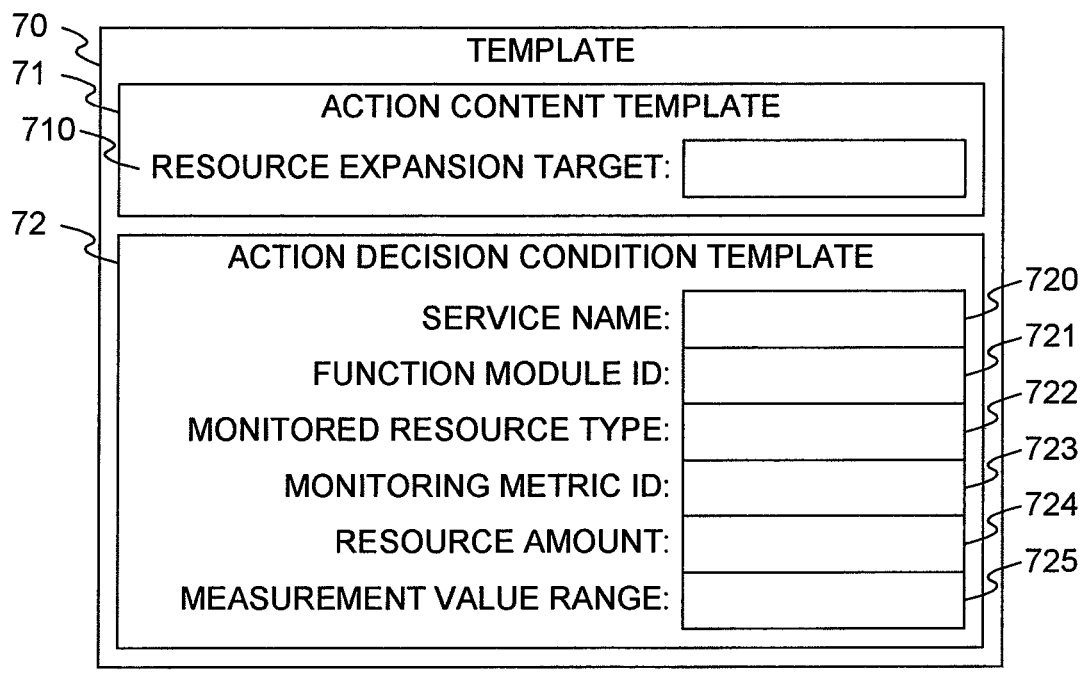
FIG. 6 is a diagram illustrating a data structure of a template.

As shown in the example of FIG. 6, a template 70 contains a countermeasure content template 71 and a countermeasure decision condition template 72. In this embodiment, the countermeasure content template 71 contains an item 710 used to designate the expansion target resource. The countermeasure decision condition template 72 contains items 720, 721, 722, and 723 which represent types of monitored items, an item 724 used to designate a resource amount of an expandable resource, and an item 725 used to designate a range of the measurement value. FIG. 6 shows the template 70 which contains the items necessary for creating an autonomic control policy 80 illustrated in FIG. 17.

As shown in the example of FIG. 7, the performance characteristic evaluation information storage unit 111 stores a plurality of records 1118 each including: a field 1110 which stores a service name, a field 1111 which stores a function module ID, a field 1112 which stores a monitored resource type, a field 1113 which stores a monitoring metric ID, a field 1114 which stores an expansion resource type, a field 1115 which stores a resource amount of the expansion resource, and a field 1116 which stores a representative measurement value to be described later; and a field 1117 which stores a change amount to be described later and is provided to every set of records that have the same values in each of the fields 1110 to 1114.

The measurement value extracting unit 113 collects data corresponding to the items described in a template stored in the template storage unit 131 from the performance measurement information stored in the performance measurement information storage unit 123. In an example case where the template shown in FIG. 6 is stored in the template storage unit 131, for each combination of the function module ID, the monitored resource type, and the monitoring metric ID, the measurement value extracting unit 113 extracts from the performance measurement information shown in FIG. 4 a service name corresponding to the function module ID with reference to the function module configuration information storage unit 125, and stores the service name in the performance characteristic evaluation information storage unit 111.

Then, for each combination of the function module ID, the monitored resource type, and the monitoring metric ID, the measurement value extracting unit 113 extracts as the representative measurement value one of measurement values of the monitoring metric for each resource amount corresponding to the expansion resource type.

Figure 8:
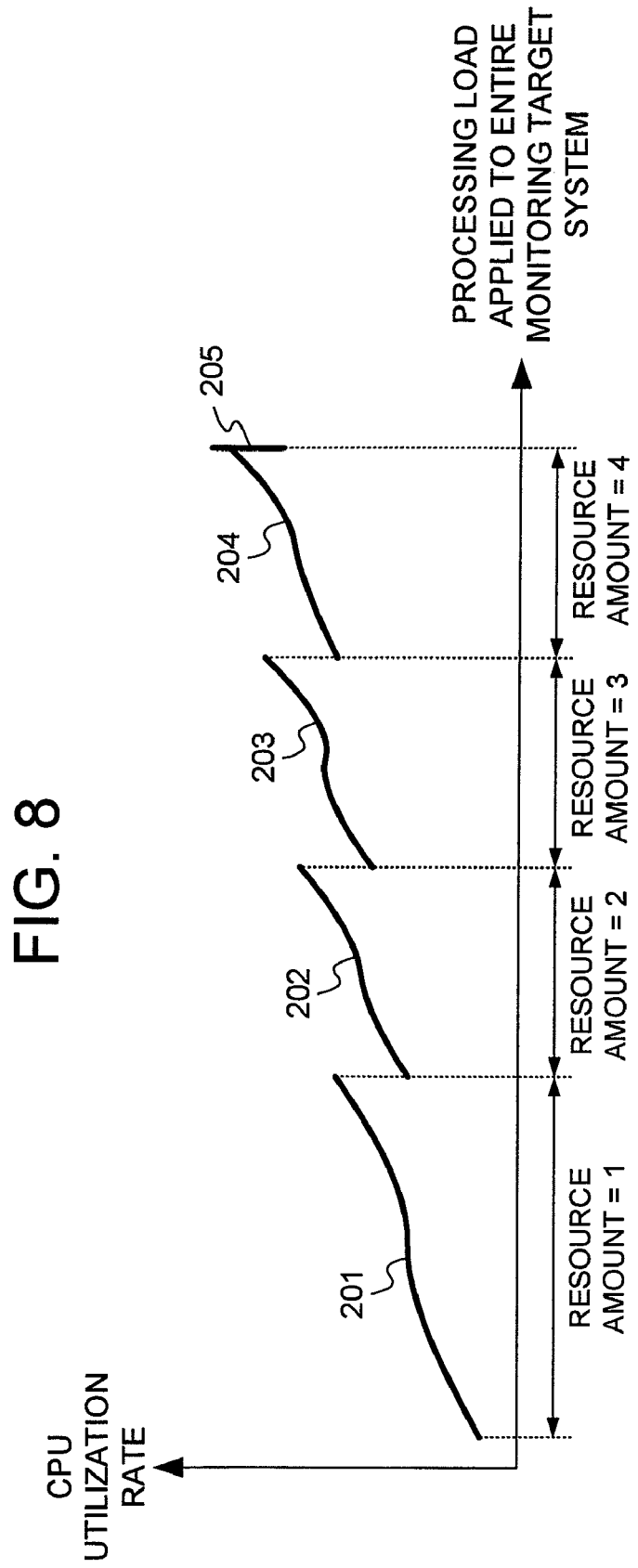
FIG. 8 is an explanatory diagram illustrating changes of measurement values with respect to a processing load applied to an entire monitoring target system on a resource-amount basis.

For example, with regard to the records shown in the example of FIG. 4 with the function module ID being "aaa", the monitored resource type being "Web server", the monitoring metric ID being "CUP utilization rate", and the expansion resource type being "Web server", graphs as shown in FIG. 8 are obtained from resource-amount-basis changes of the measurement values with respect to processing load applied to the entire monitoring target system 14. FIG. 8 illustrates an example where the resource amount is the number of computer apparatuses, and the upper limit of the number of expansion target "Web servers" corresponding to the expansion resource type, is 5. The processing load applied to the entire monitoring target system 14 is obtained as, for example, the measurement value representing the number of responses outputted from the server 15a to the work load simulator 13 in FIG. 1 per unit time period.

FIG. 8 shows graphs 201, 202, 203, 204, and 205 which represent the changes of the measurement values with respect to processing load applied to the entire monitoring target system 14 in cases of the resource amount of the expansion target resource being 1, 2, 3, 4, and 5, respectively. FIG. 8 shows how the CPU utilization rate increases in accordance with the increase in the processing load applied to the entire monitoring target system 14, causing SLA violation in the monitoring target system 14, and each time the expansion target resource is increased, the SLA violation is resolved and the load increases again. In the example of FIG. 8, in the case of the resource amount of the expansion target resource being 5, the SLA violation is not resolved, so the measurement values before the load starts to increase are obtained.

For each combination of the function module ID, the monitored resource type, the monitoring metric ID, and the expansion resource type, the measurement value extracting unit 113 extracts as the representative measurement value one of measurement values for each resource amount which is obtained when the monitoring target system 14 causes an SLA violation.

Figure 9:
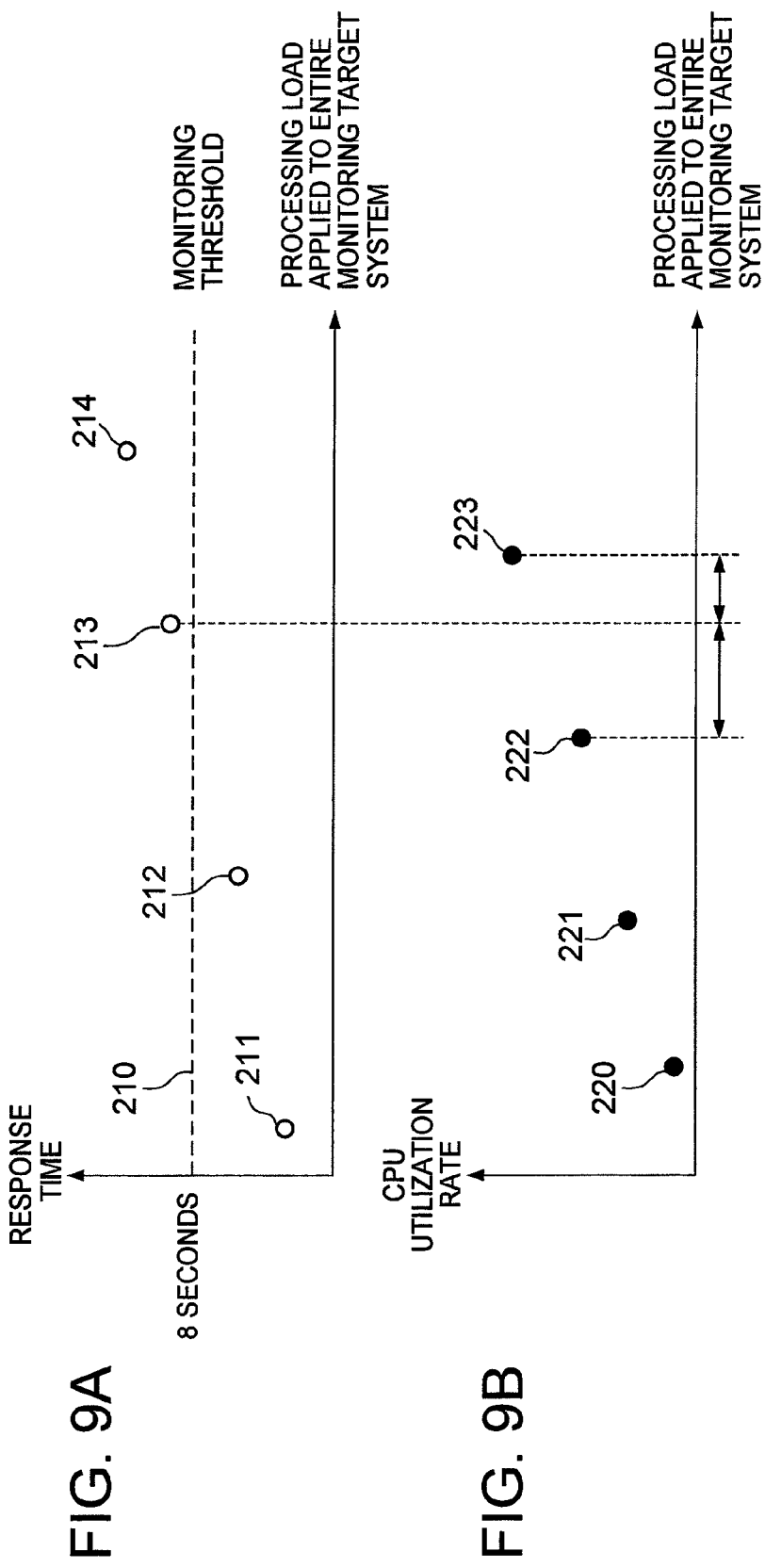
FIGS. 9A and 9B are explanatory diagrams illustrating a process in which representative measurement values are specified by a measurement value extracting unit.

FIGS. 9A and 9B are explanatory diagrams illustrating a process in which representative measurement values are specified by the measurement value extracting unit 113. FIG. 9A shows the change of the response time serving as the monitoring metric relating to the SLA with respect to the processing load applied to the entire monitoring target system 14. FIG. 9B shows the change of the measurement value of the monitoring metric shown in FIG. 8 with respect to the processing load applied to the entire monitoring target system 14.

First, the measurement value extracting unit 113 extracts a measurement value corresponding to the lowest load among measurement values 213 and 214 which have the response time being larger than a monitoring threshold 210 and which are obtained while the monitoring target system 14 is causing SLA violation. In the example of FIG. 9A, the measurement value extracting unit 113 extracts the measurement value 213. Then, the measurement value extracting unit 113 extracts the measurement value of the monitoring metric which is obtained under a load closest to the load applied when the measurement value 213 is obtained, as the representative measurement value which is the measurement value obtained when the monitoring target system 14 causes SLA violation. In the example of FIG. 9B, the measurement value extracting unit 113 extracts a measurement value 223 as the representative measurement value.

As another example, the measurement value extracting unit 113 may extract as the representative measurement value the measurement value which is obtained under a load lower than and closest to the load applied when the measurement value 213 is obtained. In this case, in the example of FIG. 9B, the measurement value extracting unit 113 extracts the measurement value 222 as the representative measurement value.

Figure 10:
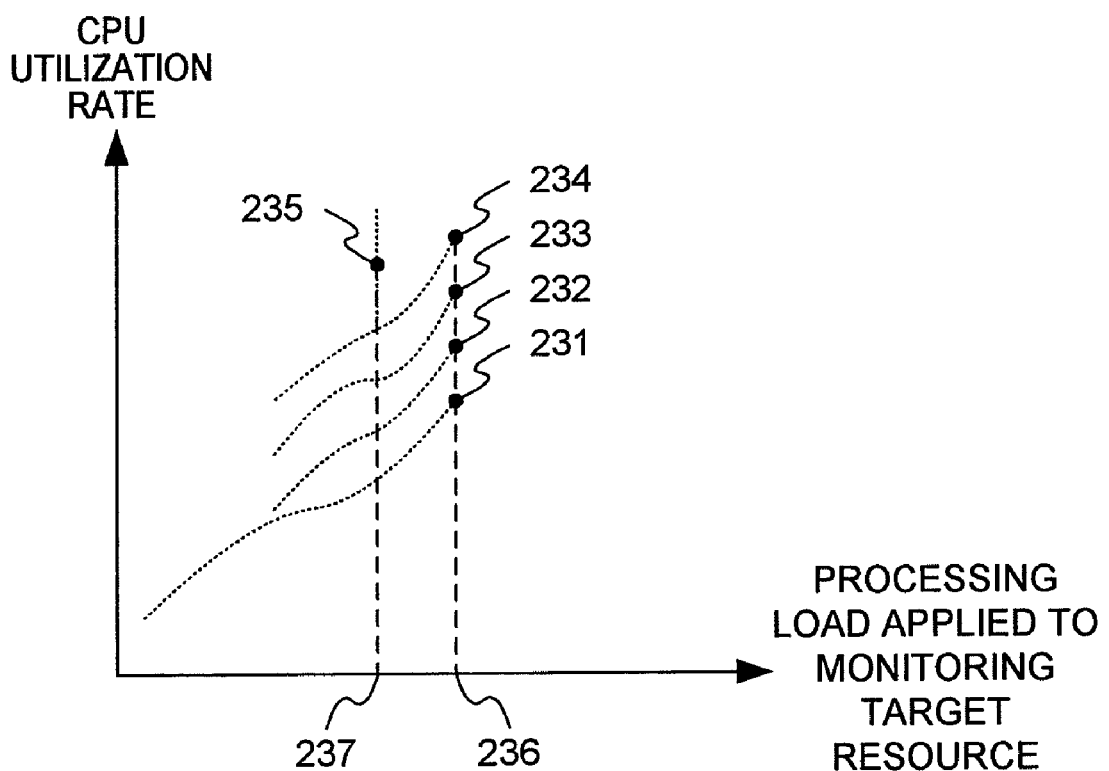
FIG. 10 is an explanatory diagram representing relationships between a processing load applied to a monitoring target resource and the representative measurement values.

Subsequently, for each combination of the function module ID, the monitored resource type, the monitoring metric ID, and the expansion resource type, the measurement value extracting unit 113 obtains from the performance measurement information storage unit 123 (FIG. 4) the load applied to the monitoring target resource when the representative measurement value is obtained. For example, FIG. 10 shows relationships between the representative measurement values and the load applied to the monitoring target resource in a given combination of the function module ID, the monitored resource type, the monitoring metric ID, and the expansion resource type.

Reference numerals 231, 232, 233, 234, and 235 denote representative measurement values in cases where the resource amount is 1, 2, 3, 4, and 5, respectively. The measurement value extracting unit 113 references loads applied when the representative measurement values are each obtained to extract a representative measurement value obtained under substantially the same load as a target for change amount calculation. In the example of FIG. 10, substantially the same loads 236 are applied when the representative measurement values 231 to 234 are each obtained, while a load 237 applied, when the representative measurement value 235 is obtained, is separate from the loads 236 applied when the representative measurement values 231 to 234 are each obtained. Therefore, the measurement value extracting unit 113 extracts the representative measurement values 231 to 234 as the targets for the change amount calculation.

Note that the measurement value extracting unit 113 may obtain a mean value (m) and standard deviation (σ) of the loads applied when the representative measurement values 231 to 235 are respectively obtained, and may extract, as the target for the change amount calculation, the representative measurement value obtained under a load within the range from m−3σ to m+3σ, for example.

Subsequently, the measurement value extracting unit 113 converts each of the representative measurement values, extracted as the target for the change amount calculation, into a relative value by assuming as 100% the total sum of the measurement values of the whole function modules operating on the computer resource in which the representative measurement value is obtained, and stores the relative value in the performance characteristic evaluation information storage unit 111.

In an example case where a function module having the ID "aaa" and a function module having the ID "bbb" are operating on a computer resource having a specific resource ID with the CPU utilization rates of the respective function modules on the computer resource being 40% and 10%, the measurement value extracting unit 113 converts the representative measurement value, corresponding to the CPU utilization rate of the function module having the ID "aaa", to 80%, and converts the representative measurement value, corresponding to the CPU utilization rate of the function module having the ID "bbb", to 20%. Then, the measurement value extracting unit 113 stores the CPU utilization rates in the performance characteristic evaluation information storage unit 111.

The measurement value extracting unit 113 stores the representative measurement value in the field 1116 of the performance characteristic evaluation information storage unit 111 in association with the service name, the function module ID, the monitored resource type, the monitoring metric ID, the expansion resource type, and the resource amount. The measurement value extracting unit 113 notifies the change amount calculating unit 112 that extraction processing for the representative measurement values has ended after the representative measurement values had been stored in the performance characteristic evaluation information storage unit 111 for every possible combination of the service name, the function module ID, the monitored resource type, the monitoring metric ID, the expansion resource type, and the resource amount that are stored in the performance measurement information storage unit 123.

By thus extracting the measurement value obtained when the monitoring target system 14 causes an SLA violation, the measurement value extracting unit 113 can obtain the measurement value under the load applied when the monitoring target system 14 causes the SLA violation. This allows the measurement value extracting unit 113 to obtain as described later the state of the monitoring target system 14 during the SLA violation in a case where the target computer resource is effectively expanded. As another example, the measurement value extracting unit 113 may extract the maximum measurement value for each resource amount as the representative measurement value.

If notified by the measurement value extracting unit 113 that the extraction processing for the representative measurement values has ended, the change amount calculating unit 112 calculates a change amount of the representative measurement value in accordance with the increase of the resource amount for each combination of the service name, the function module ID, the monitored resource type, the monitoring metric ID, and the expansion resource type, and stores the calculated change amount in the field 1117 of the performance characteristic evaluation information storage unit 111.

In this embodiment, for each combination of the service name, the function module ID, the monitored resource type, the monitoring metric ID, and the expansion resource type, the change amount calculating unit 112 calculates the change amount by subtracting the representative measurement value for the minimum resource amount from the representative measurement value for the maximum resource amount.

For example, with regard to the records shown in the example of FIG. 7 with the service name being "login", the function module ID being "aaa", the monitored resource type being "Web server", the monitoring metric ID being "CPU utilization rate", and the expansion resource type being "Web server", the change amount calculating unit 112 calculates the change amount as +40 points by subtracting the representative measurement value "40%" for the minimum resource amount, from the representative measurement value "80%" for the maximum resource amount.

As another example, for each combination of the service name, the function module ID, the monitored resource type, the monitoring metric ID, and the expansion resource type, the change amount calculating unit 112 may rearrange representative measurement values on a resource-amount basis in ascending order, calculate differences between the increasing representative measurement values, and average the calculated plurality of differences to obtain the change amount.

As yet another example, a mean value of the measurement values on a resource-amount basis may be set as the representative measurement value, and a gradient of the change in representative measurement value in accordance with the increasing resource amount may be obtained by a method of least squares. There is no limitation on a method of calculating the change amount or algorithm therefor in terms of existing general algorithm used to calculate a change in amount.

When the calculation of the change amount ends for all combinations of the service name, the function module ID, the monitored resource type, the monitoring metric ID, and the expansion resource type that are stored in the performance characteristic evaluation information storage unit 111, the change amount calculating unit 112 notifies the display unit 110 that the calculation of the change amount has ended.

Figure 11:
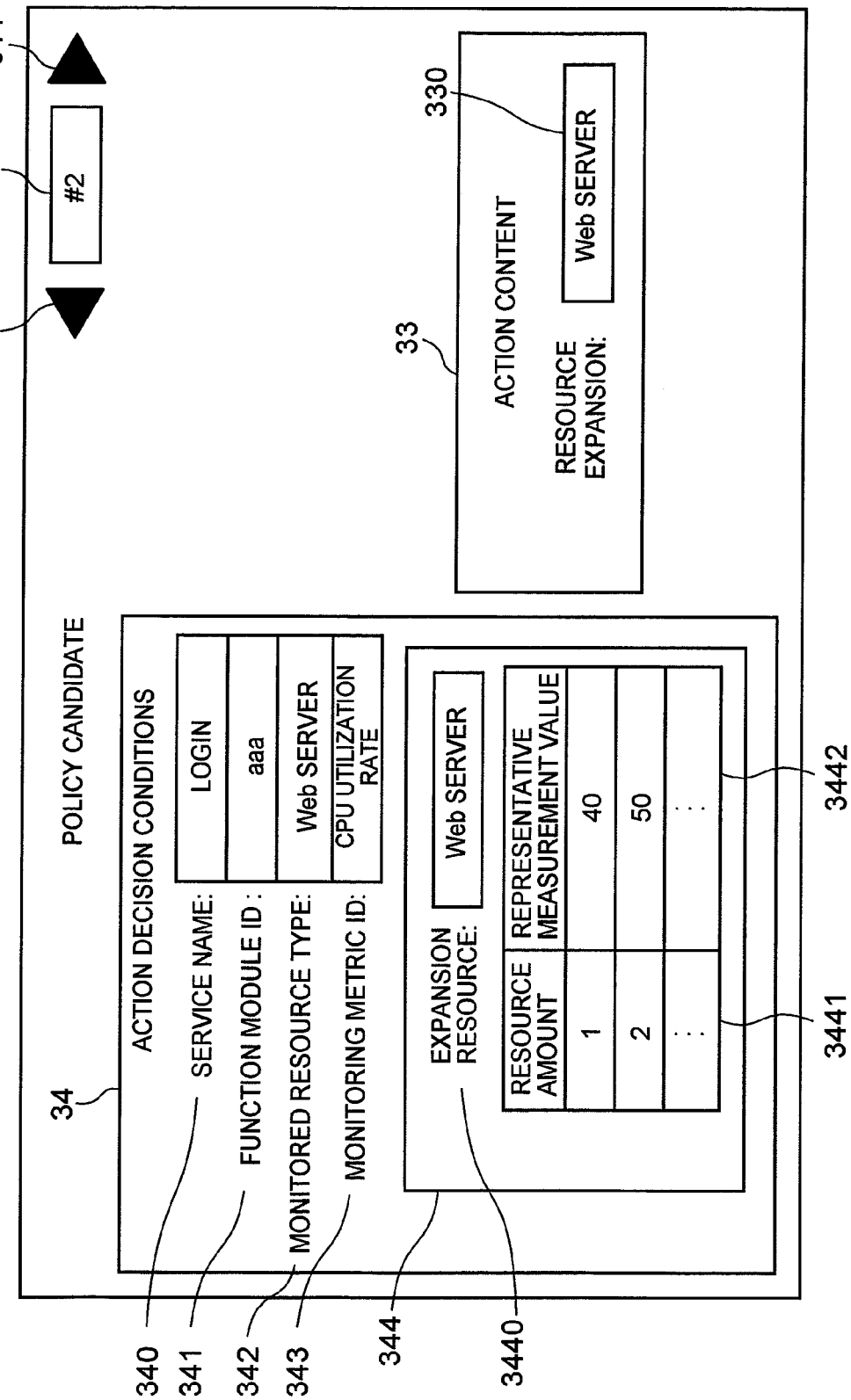
FIG. 11 is an explanatory diagram illustrating a display image displayed by the display unit.

If notified by the change amount calculating unit 112 that the calculation of the change amount has ended, the display unit 110 sorts records on a change-amount basis in descending order with the change amount stored in the fields 1117 within the performance characteristic evaluation information storage unit 111 as a key, and ranks the records so that a record having a larger change amount is associated with a higher rank. As shown in the example of FIG. 11, the display unit 110 generates a display image 30 serving to display the records on a change-amount basis along with the corresponding ranks, and displays the generated display image 30 on a display device.

The display image 30 contains an area 31 which displays rank, an area 33 which displays countermeasure content in a case where the monitoring target system 14 is violating an SLA designated by the system operator, and an area 34 which displays countermeasure decision conditions for judging which countermeasure is effective when the monitoring target system 14 violates the SLA.

The display unit 110 displays buttons 310 and 311 on the right and left of the area 31, respectively. When the button 310 is clicked through an input device such as a mouse, the display unit 110 displays in the area 31 a rank that is one rank higher than the one currently displayed therein. When the button 311 is clicked, the display unit 110 displays in the area 31 a rank that is one rank below the one currently displayed therein. In addition, the display unit 110 displays data corresponding to the rank displayed in the area 31, in the areas 33 and 34.

The display unit 110 reads an expansion resource type corresponding to the rank displayed in the area 31 from the field 1114 within the performance characteristic evaluation information storage unit 111, and displays the expansion resource type in an area 330 within the area 33. The display unit 110 also displays the service name, the function module ID, the monitored resource type, and the monitoring metric ID that correspond to the rank displayed in the area 31, in areas 340 to 343 within the area 34, respectively. Further, the display unit 110 displays the expansion resource type, the resource amount, and the representative measurement value that correspond to the rank displayed in the area 31, in areas 3440 to 3442 within an area 344, respectively.

By referring to the display image 30, a creator of an autonomic control policy can learn that in cases where the monitoring target system 14 is violating the SLA designated by the system operator, a countermeasure shown in the area 33 is effective if the monitoring target system 14 is in a state such as that shown in the area 34. The creator can further learn that the extent to which the countermeasure improves characteristics of the monitoring target system 14 corresponds to the rank shown in the area 31. This allows the creator of an autonomic control policy to create an effective autonomic control policy quickly and easily.

Figure 17:
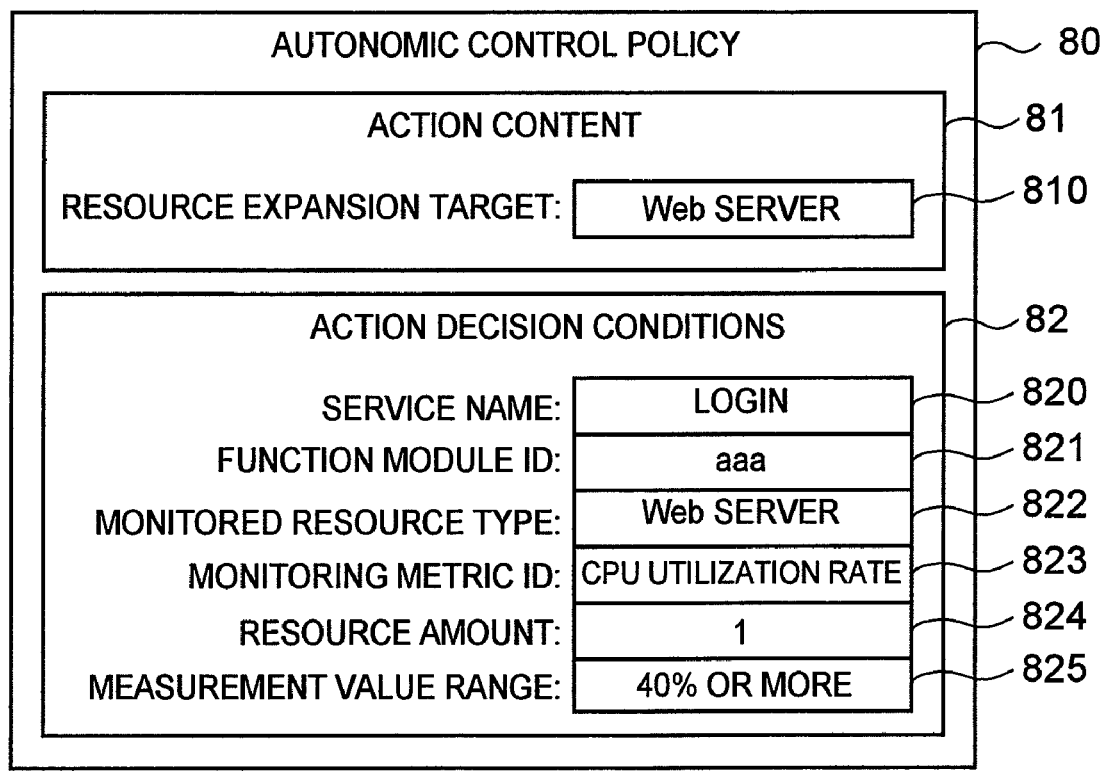
FIG. 17 is an explanatory diagram illustrating the autonomic control policy in the autonomous system according to the conventional technology.

To be specific, the countermeasure content "resource expansion" shown in FIG. 11 corresponds to the countermeasure content "resource expansion target" shown in FIG. 17. In a similar manner, the countermeasure decision conditions shown in FIG. 11, "service name", "function module ID", "monitored resource type", "monitoring metric ID", and "resource amount", correspond to the countermeasure decision conditions shown in FIG. 17, "service name", "function module ID", "monitored resource type", "monitoring metric ID", and "resource amount", respectively.

The description of this embodiment is taking an example where the target measurement value increases as the load increases. Therefore, data obtained by adding the phrase "or more" to "representative measurement value" of the countermeasure decision condition shown in FIG. 11 corresponds to "measurement value range" of the countermeasure decision condition shown in FIG. 17. In cases where the target measurement value decreases as the load increases, data obtained by adding the phrase "or less" to "representative measurement value" of the countermeasure decision condition shown in FIG. 11 corresponds to "measurement value range" of the countermeasure decision condition shown in FIG. 17.

As described above, according to the present invention, even those who have no experience and know-how can easily learn such items as have been created by system operator based on their experience and know-how within the scope of conventional technologies.

As another example, the display unit 110 may arrange that the contents of the area 344 are not displayed in the display image 30. Even in such cases, by obtaining the contents of the area 344 by another means, the creator of an autonomic control policy can create an autonomic control policy with reference to the data displayed in the display image 30.

Figure 12:
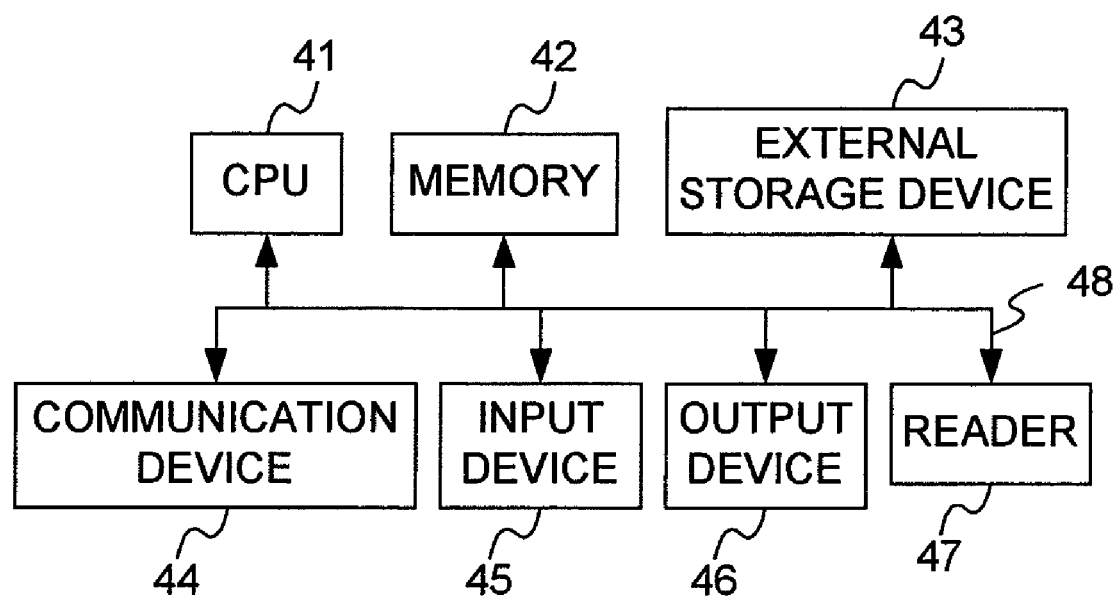
FIG. 12 is a diagram showing a hardware configuration example of a computer apparatus constituting the policy creation support system.

FIG. 12 is a diagram showing a hardware configuration example of a computer apparatus 40 constituting the policy creation support system 10. The computer apparatus 40 constituting the policy creation support system 10 of this embodiment is realized by a general computer including a CPU 41, a memory 42, an external storage device 43 such as an HDD, a reader 47 which reads data out of a storage medium such as a CD-ROM, a DVD-ROM, or an IC card, an input device 45 such as a keyboard or a mouse, an output device 46 such as a monitor or a printer, a communication device 44 which serves to communicate with another computer apparatus 40, and a bus 48 which connects those components. The policy creation support system 10 can be implemented by causing the CPU 41 of the computer apparatus 40 to execute a program loaded on the memory 42.

This program is downloaded to the external storage device 43 from the storage medium via the bus 48 or from a communication network via the communication device 44, and then loaded onto the memory 42 to be executed by the CPU 41. Alternatively, this program may be loaded directly onto the memory 42 to be executed by the CPU 41 without the intermediation of the external storage device 43. Note that any other apparatus than the computer apparatus 40 operated by the system operator does not need to include the input device 45 or the output device 46.

Figure 13:
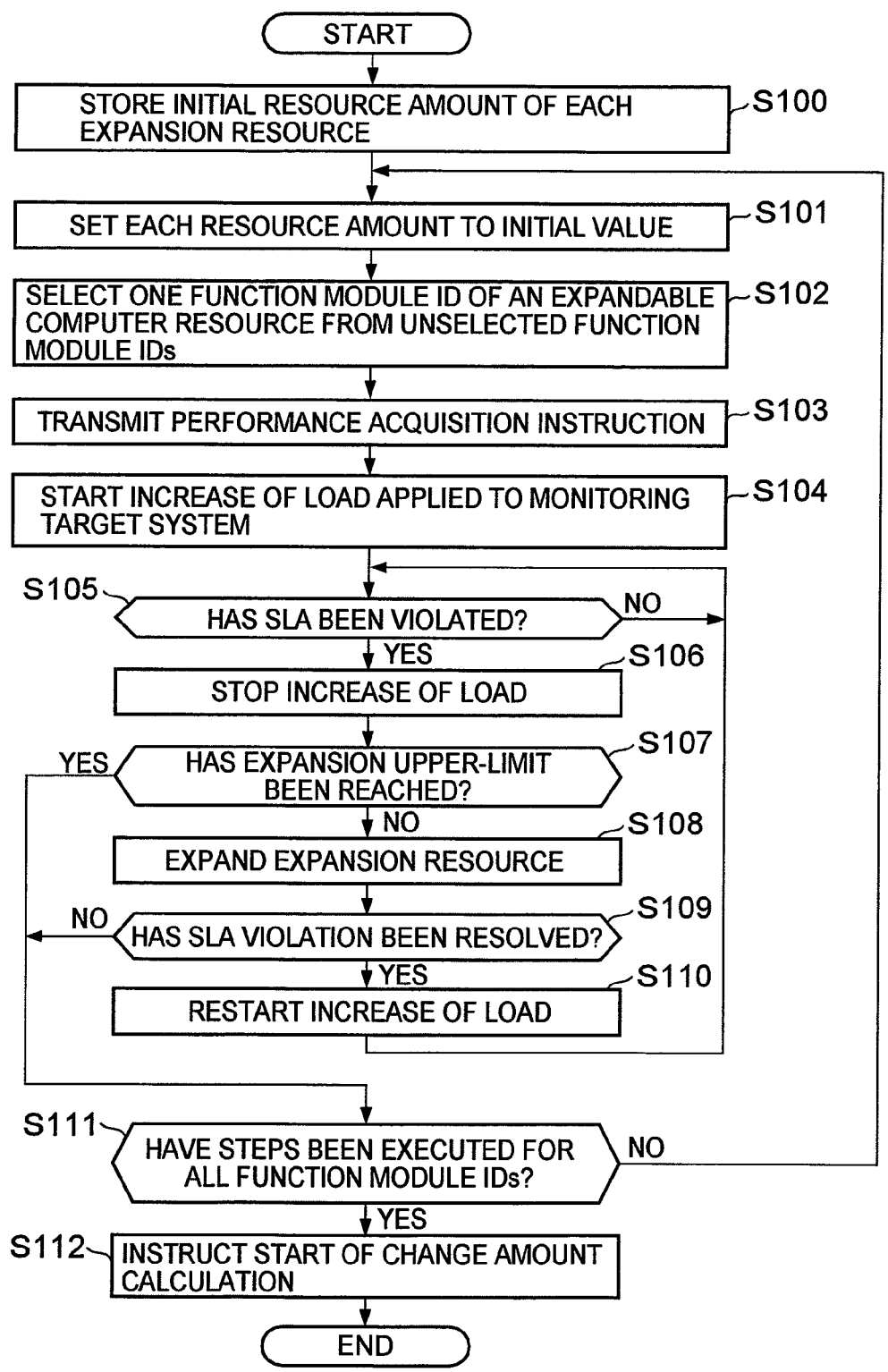
FIG. 13 is a flowchart showing an example of a performance measurement processing.

FIG. 13 is a flowchart showing an example of the performance measurement processing. The SLA receiving unit 120 receives an SLA from the system operator and stores the received SLA in the SLA storage unit 121. The SLA receiving unit 120 also instructs the performance measurement control unit 124 to start the performance measurement processing, in response to which the performance measurement block 12 starts the performance measurement processing shown in this flowchart.

First, the performance measurement control unit 124 references the resource configuration information storage unit 127 to obtain an initial value of a resource amount of each computer resource within the monitoring target system 14, and stores the initial value (S100). The performance measurement control unit 124 instructs the resource configuration control unit 126 to set the computer resource configuration within the monitoring target system 14 to the initial value (S101). Then, the performance measurement control unit 124 references the function module configuration information storage unit 125 to select one function module ID of an expandable computer resource from unselected function module IDs (S102).

Subsequently, the performance measurement control unit 124 transmits to the performance monitoring unit 128 the measurement information acquisition instruction which contains the resource type associated with the selected function module ID as the expansion resource type (S103). Upon reception thereof, the performance monitoring unit 128 starts processing of obtaining the measurement value transmitted from the monitoring target system 14 and processing of storing the obtained measurement value in the performance measurement information storage unit 123. Then, the performance measurement control unit 124 instructs the work load simulator 13 to start to increase the load applied to the monitoring target system 14 (S104).

Subsequently, of the monitoring metrics stored in the performance measurement information storage unit 123, the SLA monitoring unit 122 monitors the measurement value of a monitoring metric corresponding to the same monitoring metric ID as the monitoring metric ID stored in the SLA storage unit 121. By judging whether or not the measurement value exceeds the monitoring threshold stored in the SLA storage unit 121, the SLA monitoring unit 122 judges whether or not an SLA violation has occurred (S105). If the SLA violation has not occurred (S105: No), the SLA monitoring unit 122 repeats Step S105 until the SLA violation occurs.

If the SLA violation has occurred (S105: Yes), the performance measurement control unit 124 stops the increase of the load applied by the work load simulator 13 (S106). Then, the performance measurement control unit 124 references the field 1255 within the function module configuration information storage unit 125 to judge whether or not the expansion for the resource type corresponding to the function module ID selected in Step S102 has reached the expansion upper-limit for the resource (S107). If the expansion upper-limit has not been reached, the resource can be further expanded (S107: No) The performance measurement control unit 124 expands the resource by instructing the resource configuration control unit 126 to expand the corresponding resource type (S108).

Subsequently, the performance measurement control unit 124 references the information outputted from the SLA monitoring unit 122 to judge whether or not the SLA violation has been resolved (S109). If the SLA violation has been resolved (S109: Yes), the performance measurement control unit 124 instructs the work load simulator 13 to restart the increase of the load which has been stopped since Step S106 (S110), and the SLA monitoring unit 122 executes Step S105 again.

If the upper-limit of the expandable resource has already been reached (S107: Yes), or if the SLA violation has not been resolved even with the expansion of the resource (S109: No), the performance measurement control unit 124 judges whether or not Steps S101 to S110 have been executed for all the function module IDs stored within the function module configuration information storage unit 125 (S111). If the steps have not been executed for all the function module IDs (S111: No), the performance measurement control unit 124 executes Step S101 again. If the steps have been executed for all the function module IDs (S111: Yes), the performance measurement control unit 124 instructs the measurement value extracting unit 113 to start a change amount calculation processing (S112), and the change amount calculation block 11 ends the performance measurement processing shown in this flowchart.

Figure 14:
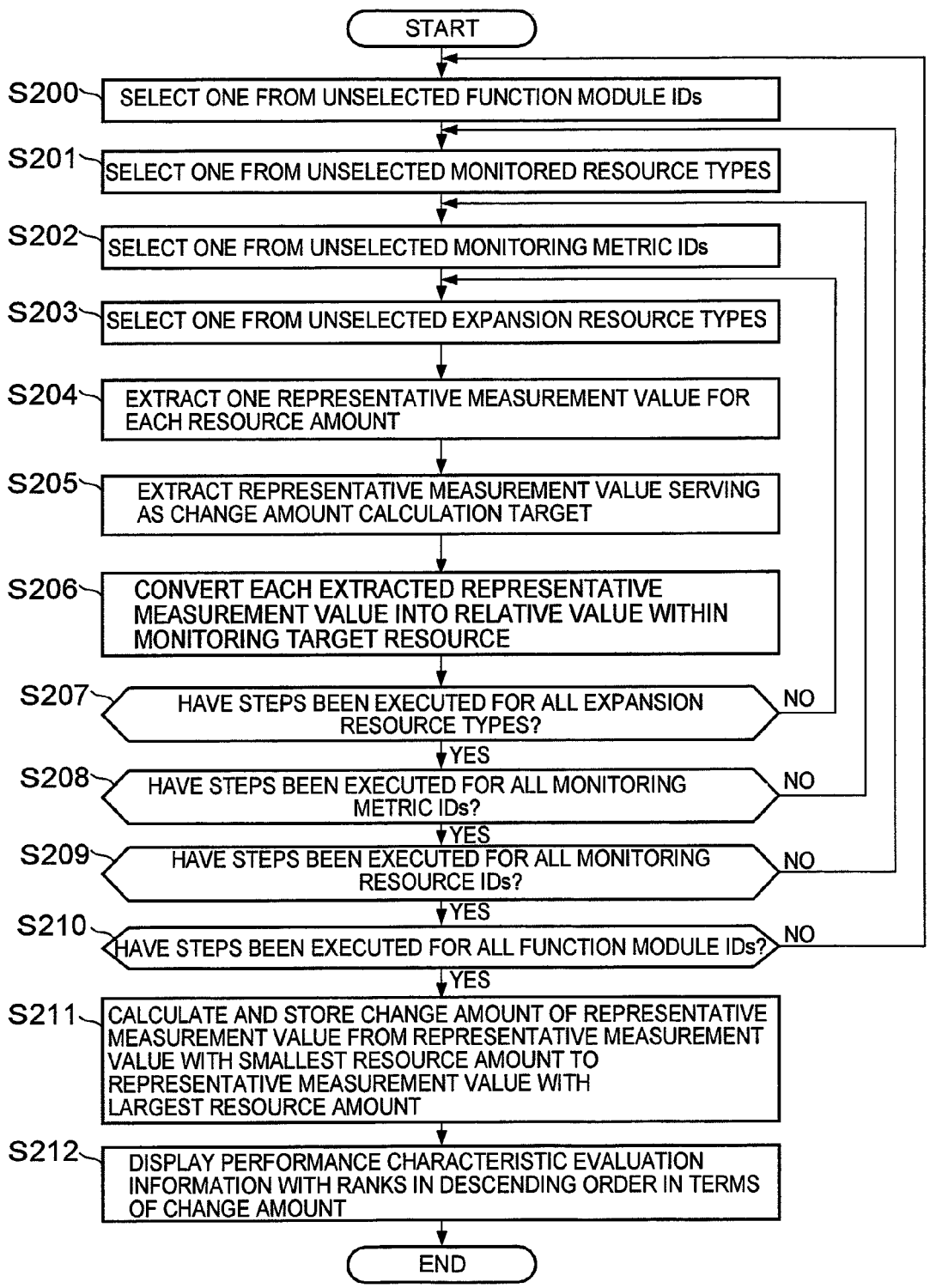
FIG. 14 is a flowchart showing an example of a change amount calculation processing.

FIG. 14 is a flowchart showing an example of the change amount calculation processing. When instructed by the performance measurement control unit 124 to start the calculation of the change amount, the policy creation support system 10 starts the change amount calculation processing shown in this flowchart. Note that the processing shown in this flowchart is executed on the precondition that the template receiving unit 130 has previously received a template shown in FIG. 6 from the system operator of the policy creation support system 10, and has stored the template in the template storage unit 131. The measurement value extracting unit 113 executes the following steps with regard to a combination of the monitoring target items of such types as described in the template stored in the template storage unit 131.

First, the measurement value extracting unit 113 refers to the performance measurement information storage unit 123 to select one of unselected function module IDs (S200), select one of unselected monitored resource types (S201), select one of unselected monitoring metric IDs (S202), and select one of unselected expansion resource types (S203).

As described above with reference to FIGS. 8, 9A, and 9B, the measurement value extracting unit 113 extracts, as the representative measurement value, one of measurement values for each resource amount which is obtained when the monitoring target system 14 causes an SLA violation (S204). As described above with reference to FIG. 10, the measurement value extracting unit 113 extracts a representative measurement value to be the target for the change amount calculation from among the representative measurement values extracted on a resource-amount basis (S205). Then, the measurement value extracting unit 113 converts the representative measurement value extracted in Step S205 into a relative value by assuming as 100% the total sum of the measurement values of the whole function modules operating on the computer resource in which the representative measurement value is obtained, and stores the relative value in the performance characteristic evaluation information storage unit 111 (S206).

Subsequently, the measurement value extracting unit 113 judges whether or not Steps S204 to S206 have been executed for all the expansion resource types (S207). If Steps S204 to S206 have not been executed for all the expansion resource types (S207: No), the measurement value extracting unit 113 executes Step S203 again.

If Steps S204 to S206 have been executed for all the expansion resource types (S207: Yes), the measurement value extracting unit 113 judges whether or not Steps S203 to S207 have been executed for all the monitoring metric IDs (S208). If Steps S203 to S207 have not been executed for all the monitoring metric IDs (S208: No), the measurement value extracting unit 113 executes Step S202 again.

If Steps S203 to S207 have been executed for all the monitoring metric IDs (S208: Yes), the measurement value extracting unit 113 judges whether or not Steps S202 to S208 have been executed for all the monitored resource types (S209). If Steps S202 to S208 have not been executed for all the monitored resource types (S209: No), the measurement value extracting unit 113 executes Step S202 again.

If Steps S202 to S208 have been executed for all the monitored resource types (S209: Yes), the measurement value extracting unit 113 judges whether or not Steps S201 to S209 have been executed for all the function module IDs (S210). If Steps S201 to S209 have not been executed for all the monitoring metric IDs (S210: No), the measurement value extracting unit 113 executes Step S200 again.

If Steps S201 to S209 have been executed for all the function module IDs (S210: Yes), the measurement value extracting unit 113 notifies the change amount calculating unit 112 that the extraction processing for the representative measurement values has ended. The change amount calculating unit 112, which has been notified to that effect, references the performance characteristic evaluation information storage unit 111 to calculate the change amount of the representative measurement value in accordance with the increase of the resource amount for each combination of the service name, the function module ID, the monitored resource type, the monitoring metric ID, and the expansion resource type, and stores the calculated change amount in the field 1117 of the performance characteristic evaluation information storage unit 111 (S211).

When the calculation of the change amount ends for all the combination of the service name, the function module ID, the monitored resource type, the monitoring metric ID, and the expansion resource type, the change amount calculating unit 112 notifies the display unit 110 to that effect. The display unit 110, which has been notified to that effect, sorts records on a change-amount basis in descending order with the change amount stored in the fields 1117 within the performance characteristic evaluation information storage unit 111 as a key, and ranks the records so that a record having a larger change amount is associated with a higher rank. Then, the display unit 110 generates the display image 30 as shown in the example of FIG. 11, and displays the generated display image 30 on the display device such as a display (S212), and the change amount calculation block 11 ends the change amount calculation processing shown in this flowchart.

The description has been made above of the first embodiment of the present invention.

As is apparent from the above description, according to the policy creation support system 10 of the present invention, it is possible to create an effective policy quickly and easily, thereby reducing the cost for creation of the effective policy.

Next, a description will be given of a second embodiment of the present invention.

Figure 15:
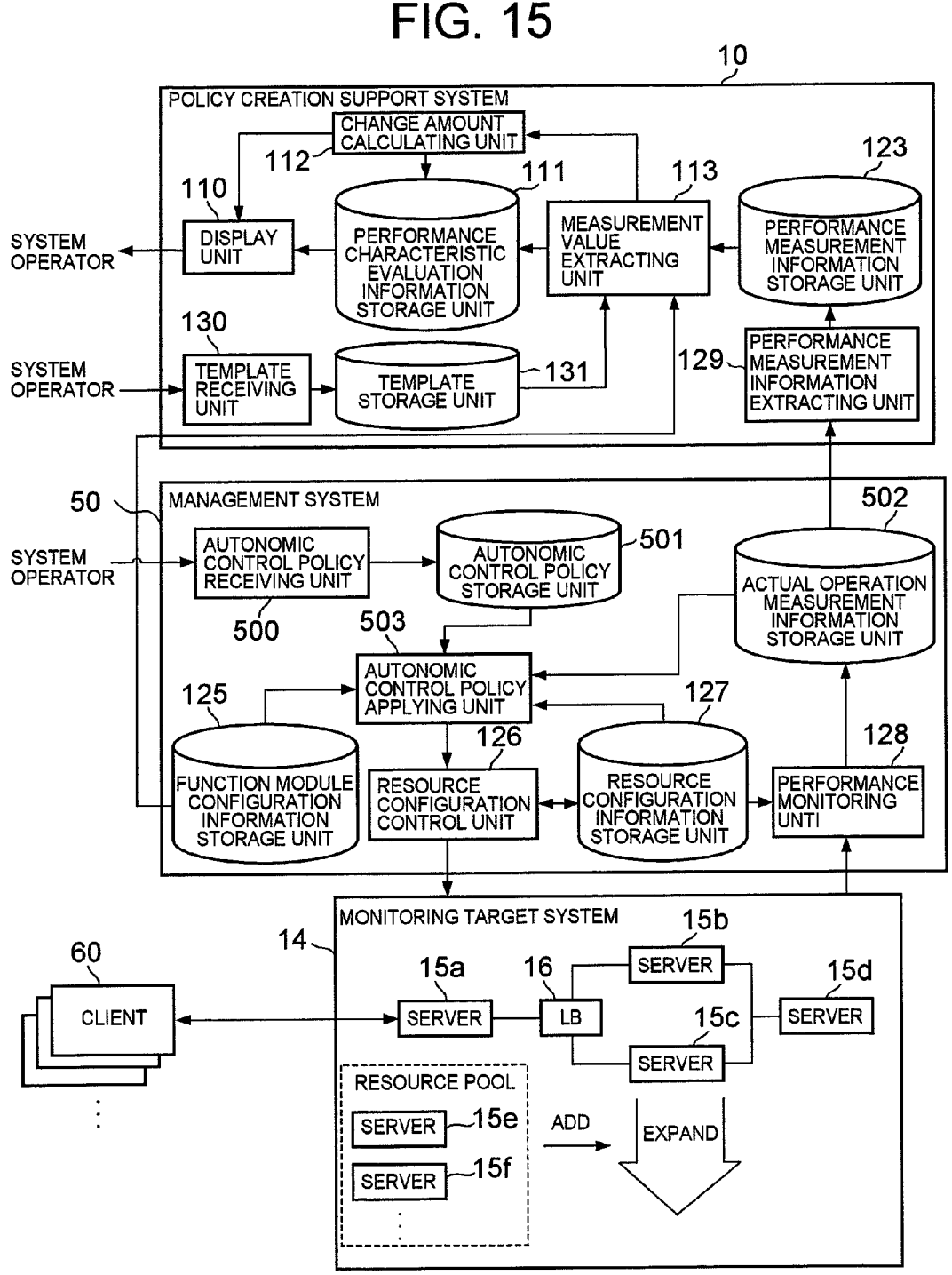
FIG. 15 is a system configuration diagram illustrating a configuration of the policy creation support system according to a second embodiment of the present invention.
Figure 16:
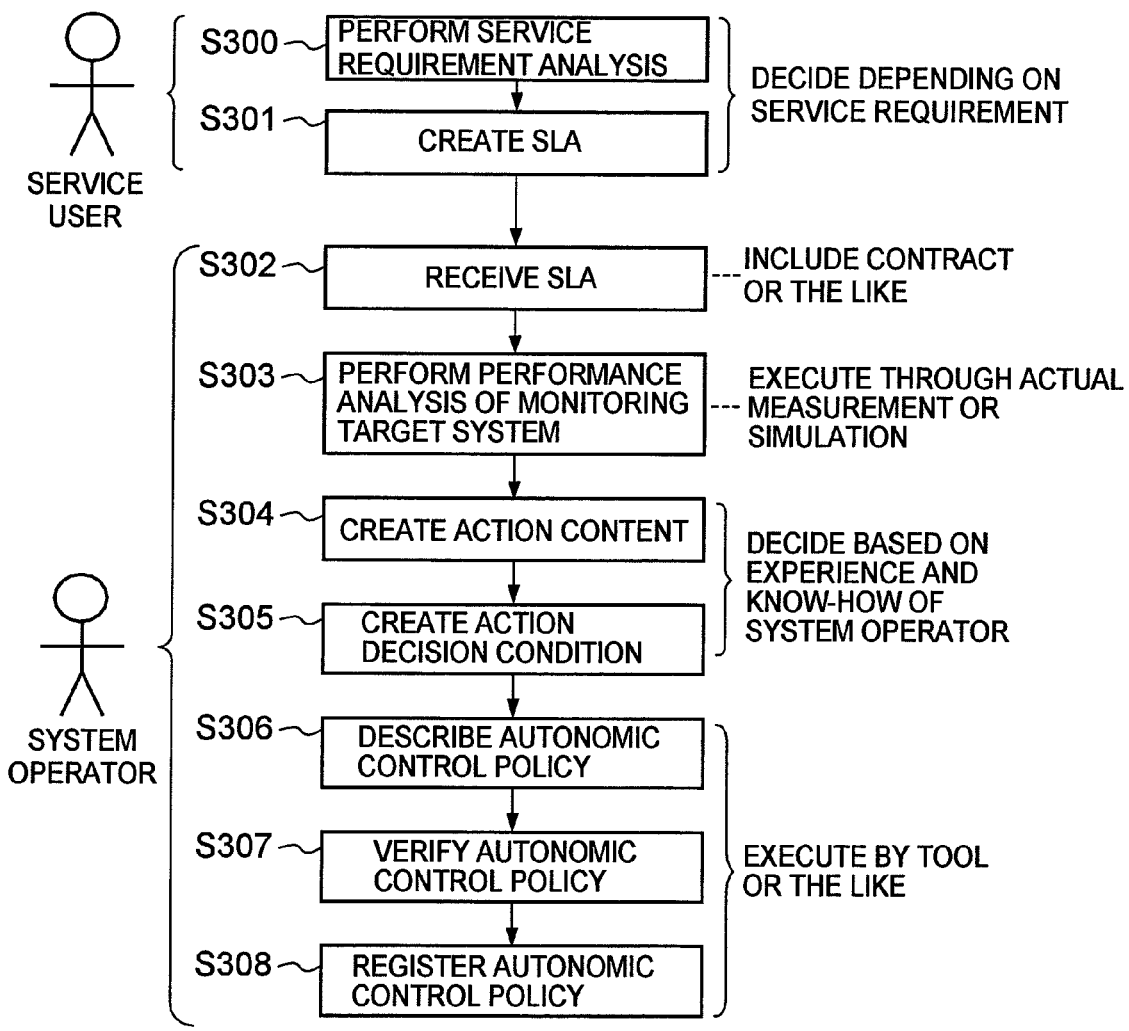
FIG. 16 is an explanatory diagram illustrating a procedure of operating an autonomic control policy in an autonomous system according to a conventional technology.

FIG. 15 is a system configuration diagram illustrating a configuration of the policy creation support system 10 according to the second embodiment of the present invention. Note that, with the exception of the description below, components shown in FIG. 15 which are denoted by the same reference symbols as FIG. 1 have the same or similar functions as the components shown in FIG. 1, and a description thereof will be omitted.

According to an autonomic control policy created by an system operator or the like, an management system 50 dynamically changes configurations of IT resources within a monitoring target system 14 depending on processing load applied to the monitoring target system 14 in response to a request from a client 60. While the service is being provided by the monitoring target system 14, the management system 50 controls the configuration of the monitoring target system 14 in real time based on the performance information of the monitoring target system 14. The management system 50 includes the function module configuration information storage unit 125, the resource configuration control unit 126, the resource configuration information storage unit 127, the performance monitoring unit 128, an autonomic control policy receiving unit 500, an autonomic control policy storage unit 501, an actual operation measurement information storage unit 502, and an autonomic control policy applying unit 503.

The autonomic control policy receiving unit 500 receives at least one autonomic control policy created by the system operator of the management system 50 or the like, and stores the received autonomic control policy in the autonomic control policy storage unit 501. Each autonomic control policy stored in the autonomic control policy storage unit 501 is composed of conditions relating to specific monitoring metrics and a countermeasure to be taken when the conditions are satisfied.

During the actual operation of the monitoring target system 14, the performance monitoring unit 128 collects the performance information of the monitoring target system 14, and stores the performance information in the actual operation measurement information storage unit 502. The actual operation measurement information storage unit 502 stores a measurement value for each combination of the function module ID, the monitored resource type, and the monitoring metric ID along with the resource amount of each computer resource and the processing load applied to each computer resource which are obtained when the measurement value is obtained.

The autonomic control policy applying unit 503 references the actual operation measurement information storage unit 502 to monitor the monitoring metrics corresponding to the conditions of each of the autonomic control policies stored in the autonomic control policy storage unit 501. If the conditions contained in any autonomic control policy are satisfied, the autonomic control policy applying unit 503 instructs the resource configuration control unit 126 to take the countermeasure corresponding to the conditions. The term "countermeasure" indicates, for example, the expansion or contraction of a specific computer resource within the monitoring target system 14.

For example, the policy creation support system 10 calculates an autonomic control policy candidate by using the measurement information of the monitoring target system 14 stored in the actual operation measurement information storage unit 502 within the management system 50 at a timing specified by the system operator of the policy creation support system 10. The policy creation support system 10 includes the display unit 110, the performance characteristic evaluation information storage unit 111, the change amount calculating unit 112, the measurement value extracting unit 113, the performance measurement information storage unit 123, the performance measurement information extracting unit 129, the template receiving unit 130, and the template storage unit 131. The performance measurement information extracting unit 129 extracts the performance measurement information, which has been described with reference to FIG. 4, from the measurement information of the monitoring target system 14 stored in the actual operation measurement information storage unit 502, and stores the performance measurement information in the performance measurement information storage unit 123.

The second embodiment of the present invention has been described above.

In a similar manner, according to this embodiment, the policy creation support system 10 can create an effective autonomic control policy quickly and easily, and can reduce the cost for creation of the effective policy.

Note that the present invention is not limited to the above embodiments, and various modifications may be made within the scope of the gist of the present invention.

For example, in the second embodiment, each of the management system 50 and the policy creation support system 10 may be realized by a single apparatus or may be constituted of a plurality of apparatuses. The description of this embodiment has been made by assuming that the management system 50 and the policy creation support system 10 are separate systems. However, the present invention is not limited thereto, and the policy creation support system 10 may be incorporated into the management system 50.

Further, in the first or second embodiment, the display unit 110 has been described as displaying a screen such as that shown in FIG. 11, on the display device. However, as another embodiment, the display unit 110 may display the screen shown in FIG. 11 only for a policy candidate that is ranked first in order. In addition, the display unit 110 may output data having a structure such as that shown in FIG. 17 with regard to the policy candidate that is ranked first. This allows the system operator to use the provided policy for the management without any change, which leads to further reduction in the management cost.

Further, in the first or second embodiment, the policy creation support system 10 has been described as outputting the autonomic control policy containing the countermeasure decision conditions and the countermeasure content. However, as another embodiment, the policy creation support system 10 may output only the countermeasure decision conditions of the autonomic control policy. Accordingly, the countermeasure decision conditions outputted from the policy creation support system 10 can be used as conditions for a trigger to request the system operator to take a countermeasure for restoring the performance, in an management system having no autonomic control function to monitor the performance of the monitoring target system 14, notify the system operator if performance deterioration is detected, and cause the system operator to manually execute the countermeasure for restoring the performance.

The present invention has been described above by use of the embodiments. However, the technical scope of the present invention is not limited to the scope of descriptions of the above embodiments. It is also evident to those skilled in the art that various modifications and improvements can be added to the above embodiments. Further, it is evident from the description of the scope of claims that the embodiment added with such modifications and improvements can also be included in the technical scope of the present invention.

What is claimed is:

1. A system comprising:
a monitoring target system including a plurality of resources, and providing a service using the resources;
a policy creation support system, executed at least in part by a hardware processor, controlling the monitoring target system based on a service level agreement (SLA) including a range of a service metric for the service,
wherein for assigned resources which will be used to provide the service, the policy creation support system stores an autonomic control policy including:
(1) a threshold metric of a certain resource, and
(2) an action executed if the threshold metric is satisfied,
wherein for said assigned resources which will be used to provide the service, the autonomic control policy is created by the policy creation support system according to:
(A) generating a workload of the service;
(B) obtaining a metric of currently used resources at a time corresponding to a violation of the range in the autonomic control policy about the service metric;
(C) calculating the threshold metric of the autonomic control policy, based on the obtained metric,
wherein the action in the autonomic control policy is to use an additional resource for providing the service; and
wherein obtained metrics used in the calculating are designated by a template stored in the policy creation support system.

2. A system comprising:
a monitoring target system including plural resources, and providing a service using the resources;
a policy creation support system, executed at least in part by a hardware processor, controlling the monitoring target system based on requirements of a service level agreement (SLA) including a range of a service metric for the service,
wherein for each combination of the resources which will be used to provide the service, the policy creation support system stores an autonomic control policy including:
(1) a threshold metric of a certain resource, and
(2) an action executed if the threshold metric is satisfied,
wherein for said each combination of the resources which will be used to provide the service, the autonomic control policy is created by the policy creation support system according to:
(A) generating a workload of the service;
(B) obtaining a metric of currently used resources at a time corresponding to a violation of the range of the service metric for the service;
(C) calculating the threshold metric of the autonomic control policy, based on the obtained metric,
wherein the action in the autonomic control policy is to use an additional resource for providing the service; and
wherein obtained metrics used in the calculating are designated by a template stored in the policy creation support system.

* * * * *